United States Patent

[11] 3,597,016

| [72] | Inventors | Jean Gachot<br>179 Avenue de la Division Leclerc, Enghien (Vald'Oise);<br>Fernard Perales, 87 Rue A.G. Belin, Argenteuil, (Vald'Oise), both of, France |
|------|-----------|---|
| [21] | Appl. No. | 824,830 |
| [22] | Filed | May 15, 1969 |
| [45] | Patented | Aug. 3, 1971 |
| [32] | Priority | May 17, 1968 |
| [33] | | France |
| [31] | | 152,256 |

[54] LOCKING SYSTEM FOR COMPRESSED-AIR BRAKES IN MOTOR VEHICLES
12 Claims, 20 Drawing Figs.

[52] U.S. Cl. ................................................. 303/89,
92/27, 188/67, 188/265, 303/13
[51] Int. Cl. .................................................. B60t 13/36,
B60t 17/16
[50] Field of Search .......................................... 188/265,
67; 92/24, 27—28; 303/89, 13, 7

[56] References Cited
UNITED STATES PATENTS

| 3,453,030 | 7/1969 | Cumming | 303/89 |
| 3,508,794 | 4/1970 | Engle | 303/89 X |

FOREIGN PATENTS

| 747,829 | 6/1933 | France | 303/89 |

*Primary Examiner*—Milton Buchler
*Assistant Examiner*—John J. McLaughlin
*Attorney*—Young and Thompson ABSTRACT: A locking system for compressed-air brakes of motor vehicles which comprises air-operated locking units for the operating rod of the brake cylinder, characterized in that it comprises two similar circuits for the distribution of air to the locking units and means for delivering air under pressure selectively into either of said two circuits in order to cause respectively the locking or release of the brakes.

The two air distribution circuits aforesaid each comprise a bypass for delivering air under pressure into the brake cylinder so that the system is thus permitted in the release position to serve as an emergency brake during normal running of the vehicle.

LOCKING SYSTEM FOR COMPRESSED-AIR BRAKES IN MOTOR VEHICLES

This invention relates to a system for locking the compressed-air brakes of motor vehicles when these latter are parked. This system can also be employed for emergency brake control during normal running of the vehicle.

Compressed-air locking systems which are already known comprise means for immobilizing the operating rod of the brake cylinder, such means being constituted, for example, by rollers which are placed between said rod and a jamming ramp and which are urged by a spring towards the jamming position. Under normal running conditions, said rollers are maintained at a distance from the operating rod of the brake cylinder by a piston which is subjected to the action of air under pressure. The locking action is obtained by reducing the air pressure to zero. Systems of this type do provide effective locking but suffer from a major disadvantage in that the air pressure has to be continuously maintained during normal running. If a leak develops, for example, and results in a failure of pressure while the vehicle is in motion, abrupt locking occurs as soon as the brakes are applied and this may cause serious accidents.

A system of another known type referred-to as the safety brake system comprises a brake cylinder in which a piston is urged towards the brake application position by means of a spring. In normal operation, the action of the spring is counterbalanced by the action of the air under pressure which is applied to one face of said piston and brake action is produced by reducing the air pressure to zero. These systems have a disadvantage in that the brakes immediately lock in the event of sudden pressure failure and are only partially applied in the event of slight leakage in the air lines. This causes heating of the linings and the brakes can consequently become wholly inoperative.

The primary object of the present invention is to overcome the disadvantages mentioned above by permitting effective locking of the brakes only when action is produced by the driver of the vehicle.

According to the invention, the locking system for compressed-air brakes of motor vehicles which comprises air-operated locking units for the operating rod of the brake cylinder is characterized in that it comprises two similar circuits for the distribution of air to the locking units and means for delivering air under pressure selectively into either of said two circuits in order to cause respectively the locking or release of the brakes.

In this manner, both locking and unlocking are initiated by delivery of air under pressure, thereby preventing any accidental locking as a result of leakage.

In a preferred embodiment of the invention, the two air distribution circuits each comprise a bypass for delivering air under pressure into the brake cylinder at the same time as the locking units, with the result that the system may be employed in particular for producing emergency brake action during normal running of the vehicle.

In accordance with an improved embodiment of the invention, the locking units comprise a time-delay system so arranged as to permit instantaneous admission of control air and to introduce a time delay in the discharge of said air. The locking units thus have the time to operate completely in spite of their inertia.

In accordance with an advantageous embodiment of the invention, the locking system is applied to a vehicle which draws a trailer or a semitrailer equipped with an emergency relay valve which is adapted to actuate the trailer brakes in the event of failure of the hitch system. In this case, the system comprises on the tractor an exhaust valve which, in the locking position, opens the inlet of the emergency relay valve to the atmosphere in order to initiate the operation of this latter. Moreover, a reversing valve which is mounted on the trailer puts the outlet of the emergency relay valve into communication with the locking units of the trailer brake cylinder. Adaptation of the locking system to the trailer is thus effected by virtue of simple and inexpensive means.

Further properties of the invention will become apparent from the description which now follows below, reference being made to the accompanying drawings in which a number of embodiments of the invention are illustrated by way of nonlimitative examples, and in which.

Figure 1:
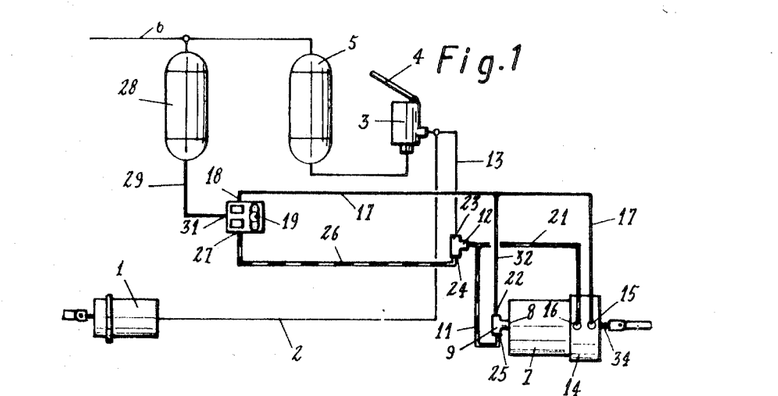
FIG. 1 is a pneumatic diagram of a braking and locking system comprising a single-piston brake cylinder.

There is shown in FIG. 1 a braking and brake-locking circuit for a trailerless vehicle equipped with single-piston brake cylinders.

In this figure and in similar figures, the circuits corresponding to normal brake application are shown in thin lines whilst the locking control circuits are shown in thick lines and the unlocking or release control circuits are shown in thick dashed lines.

The brake cylinder 1 which actuates the front wheel brakes is supplied through a circuit 2 which is connected to a conventional control valve 3, said valve being controlled by the brake pedal 4 and supplied from a main compressed-air reservoir 5. Said reservoir 5 is in turn supplied through the pipe 6 which is connected to an air compressor (not shown in the drawings).

The brake cylinder 7 which controls the rear wheel brakes is supplied for normal brake application through a circuit comprising a pipe 13 which provides a connection between the outlet of the control valve 3 and an inlet 23 of a two-way valve 12, and a pipe which provides a connection between the outlet of the valve 12 and the inlet 25 of a second two-way valve 9, the outlet of which is connected to a port 8 for the admission of air into the brake cylinder 7.

The cylinder 7 additionally comprises pneumatic locking units 14 which will be described hereinafter.

In order to control said units 14, the invention makes provision for two similar circuits for the distribution of compressed air. The first of these circuits which is employed for the brake-locking operation comprises a pipe 17 which is connected at one end to an admission port 15 of the locking units 14 and at the other end of a discharge port 18 of a manual control box 19. The second air distribution circuit serves to control the unlocking operation and comprises a pipe 21 which provides a connection between a second admission port 16 of the units 14 and the outlet of the two-way valve 12, and a pipe 26 which connects a second inlet 24 of the valve 12 to a second outlet 27 of the control box 19. An auxiliary compressed-air reservoir 28 joined to the pipe which is connected to the air compressor feeds via a pipe 29 an admission port 31 of the control box 19.

Each of the two distribution circuits mentioned above comprises a bypass for diversion to the admission port 8 of the brake cylinder. Said bypasses are constituted in the case of the locking circuit by a pipe 32 which connects the circuit 17 to a second admission port 22 of the valve 9 and, in the case of the unlocking circuit, by the pipe 11 which also forms part of the normal brake circuit.

When the vehicle is parked, the brakes are locked by putting the box 19 in the locking position. This operation causes compressed air to be delivered from the auxiliary reservoir 28 through the admission port 15 of the locking units 14 of the brake cylinder 7 via the distribution circuit 17. At the same time, the air under pressure is delivered through the bypass 32 to the admission port 8 of the brake cylinder 7. The brakes are thus applied and locked.

In order to unlock the brake system, the control box 19 is changed over to the unlocking or "release" position, which causes the delivery of compressed air on the one hand to the admission port 16 of the locking units 14 via the pipes 21 and 26 and, on the other hand, to the admission 8 of the brake cylinder 7 via the bypass 11, the result thereby achieved being to facilitate the disengagement of the brake-operating rod as will be explained hereinafter.

Control of both unlocking and locking is carried out in a positive manner by delivery of compressed air, thereby removing any danger of accidental locking of the brakes.

Braking under normal running conditions is carried out in the usual manner by operating the brake pedal 4 which actuates the valve 3 and initiates the delivery of air from the main reservoir 5 to the brake cylinders 1 and 7 through the circuit 2 on the one hand and the circuits 11 and 13 on the other hand.

The insertion of the two-way valve 12 makes it possible on the one hand to control the brake release as soon as the vehicle is parked by means of the brake pedal 4 and the control valve 3 and, on the other hand, to employ the manual control box 19 and the auxiliary reservoir 28 for emergency braking during normal running.

Figure 9:
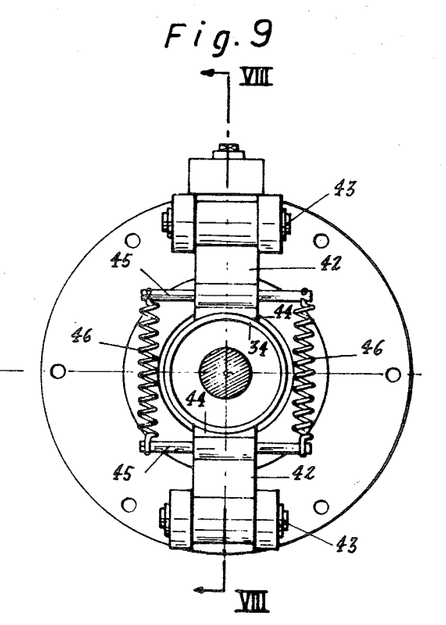
FIG. 9 is a side elevation view of the brake cylinders which are illustrated in FIGS. 2, 3 and 8.

There will now be described with reference to FIGS. 2, 3 and 9 the locking units 14 which are mounted on the brake cylinder 7.

There is housed within the interior of the brake cylinder 7 a piston 33 which carries a brake-actuating rod 34 and is subjected to the action of a restoring spring 35. Leak-tightness between the piston 33 and the internal wall of the cylinder 7 is ensured on the one hand by means of a lubricating felt packing-ring 36 and, on the other hand, by means of a packing-ring 37 which is fitted within an annular channel 38 formed at the periphery of the front face of the piston 33. The internal cylindrical wall of the cannel 38 is provided with a circular groove 39 in which is fitted an annular bead 41 formed on the packing-ring 37, thereby ensuring that said packing-ring is maintained in position in a simpler and more effective manner than the usual front annular flanges.

The locking units 14 comprise two locking arms 42 which are pivoted about a pin 43 located at right angles to the axis of the brake cylinder 7 and disposed symmetrically with respect to the brake-actuating rod 34. The extremity 44 of the arms 42 (as shown in FIG. 9) has a cylindrical profile which fits around the external wall of the rod 34. Each locking arm 42 is provided with a yoke 45 which is parallel to the pivot pin 43 and placed in the vicinity of the extremity 44 of the locking arm 42. The oppositely located yokes 45 are interconnected by means of helical springs 46 which tend to apply the ends of the arms 42 against the brake-actuating rod 34. The length of each arm 42 is such that, when said arms are applied against the rod 34 (as shown in FIG. 2), they make an acute angle with the half-axis of the rod 34 which is directed towards the piston 33, so that any tendency of the rod 34 towards backward motion results in abutting application of the arms 42.

The locking arms 42 are protected by a casing 71 which is fitted with a packing gland 72 for preventing any admission of impurities and in particular water. In the embodiment which is illustrated, the packing gland is constituted simply by a felt seal but provision could also be made instead of this latter for a protective bellows seal mounted around the brake-actuating rod 34.

The pneumatic actuating means for the locking arms 42 comprise a cylinder 47 in which a locking piston 48 is slidably fitted. The cylinder 47 is constituted by a toric volume which is coaxial with the brake cylinder 7 and delimited by two cylindrical lateral surfaces 57, 58 and annular wall 59 which forms the back-head of the brake cylinder 7 and a removable annular endwall 61. The internal lateral surface 58 delimits a bore 49 through which the brake-actuating rod 34 passes. A guide ring 51 of self-lubricating plastic material is fitted in a channel formed in the wall of the bore 49 and serves to guide the cylinder 47 and the brake-actuating rod 34. A locking-control air-admission port 15 and a release-control port 16 are pierced in the external lateral surface 57 and open respectively into the chambers 52a and 52b which are delimited by the piston 48.

The locking piston 48 has a central cup 55, the cylindrical wall 56 of which is adapted to fit over the internal lateral surface 58 of the cylinder 47 and serves to guide the piston 48. The cup 55 projects from the cylinder 47 into an annular space 62 which is formed between the endwall 61 and the internal lateral wall 58 of the cylinder 47. The bottom 63 of the cup 55 is pierced by a hole 64 so as to provide a passageway for the brake-actuating rod 34 and is provided with a rounded edge 65 having a profile which is studied so as to form an abutment shoulder which is applied against the locking arms 42 in the release position (as shown in FIG. 3). O-ring seals 66 to 69 ensure leak-tightness between the cylinder 47, the piston 48 and the cylinder endwall 61.

Figure 2:
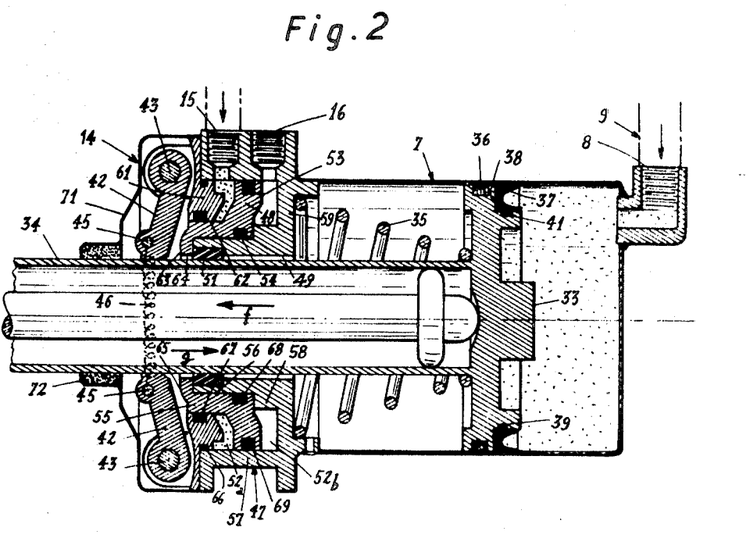
FIG. 2 is an axial sectional view of the corresponding brake cylinder as shown in the locking position.

When the control box 19 is brought into the locking position, the compressed air is admitted on the one hand into the admission port 8 of the brake cylinder 7 (as shown in FIG. 2), thereby displacing the piston 33 and the brake-actuating rod 34 in the direction of the arrow f and initiating the application of the brakes. In addition, the air under pressure is also admitted through the port 15 into chamber 52a of the cylinder 47 so as to cause the displacement of the locking piston 48 in the direction g and moves the abutment shoulder 65 away from the locking arms 42. Said arms which are acted upon by the restoring springs 46 are accordingly applied against the brake-actuating rod 34. The control box 19 is brought into the neutral position and, as will be explained hereinafter, thus causes the discharge of the air which is contained within the cylinders 7 and 47. The restoring spring 35 of the brake-application piston 33 tends to cause the displacement of the brake rod 34 in the direction of the arrow g thereby abuttingly applying the arms 42 against the rod 34 and locking this latter in position. The locking force is thus exerted by the restoring spring 35 of the brake-application piston, the intended function of the springs 46 of the arms 42 being simply to bring said arms into contact with the brake-actuating rod 34.

Figure 3:
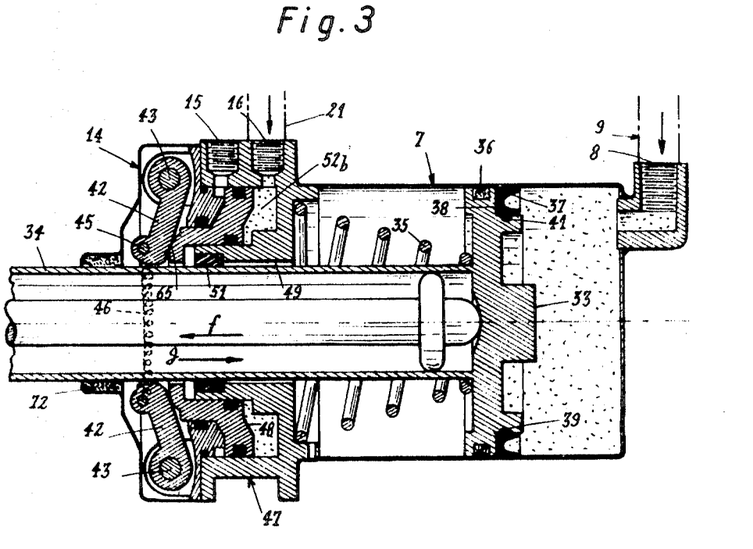
FIG. 3 is the corresponding view of the brake cylinder in the release position.

In order to release the brakes, the control box 19 is placed in the unlocking position so as to cause the admission of air simultaneously into the brake cylinder 7 via the port 8 and into the chamber 52b of the cylinder 47 (as shown in FIG. 3) via the port 16. The air pressure which is exerted on the brake-application piston 33 causes a very slight displacement of the brake-actuating rod 34 in the direction of the arrow f, with the result that the arms 42 are no longer abuttingly applied against the rod 34. At the same time, the locking piston 48 also moves in the direction f and moves the arms 42 away from the rod 34 by means of its abutment shoulder 65. When the control box 19 is moved to the neutral position, the air is discharged from the cylinders 7 and 47. In accordance with an important property of the invention, the restoring springs 46 of the arms 42 are so dimensioned that the restoring force which they exert on the arms 42 is not sufficient to overcome the friction caused in particular by the seals 54, 62 and 69. In consequence, when the air is discharged from the cylinder 47, the arms 42 are held away from the brake-actuating rod 34 and this latter is accordingly returned in the direction g by the spring 35, which consequently releases the brakes.

During normal running of the vehicle, the arms 42 remain separated from the brake-actuating rod 34 and this latter can be actuated either in the direction f or g as a result of operation of the control valve 3 and the action of the spring 35.

Figure 4:
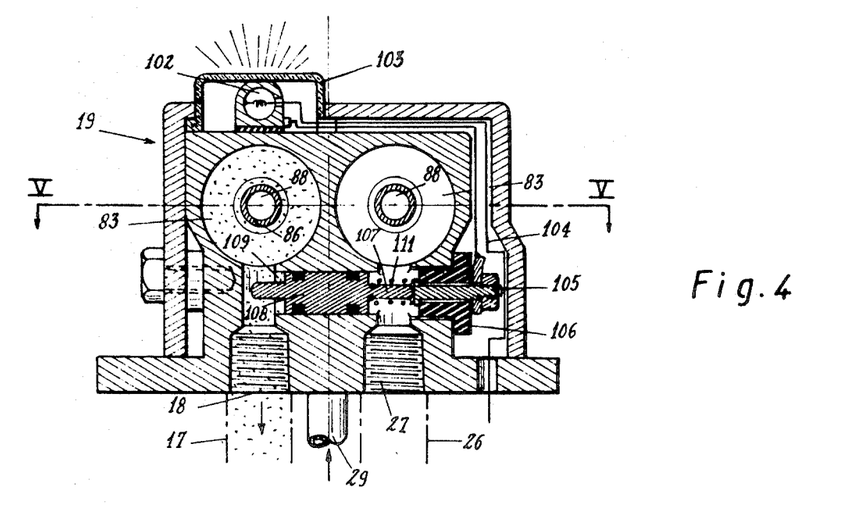
FIG. 4 is a longitudinal sectional view taken along line IV-IV of FIG. 5 showing the manual control box which is employed in the device of FIG. 1.
Figure 5:
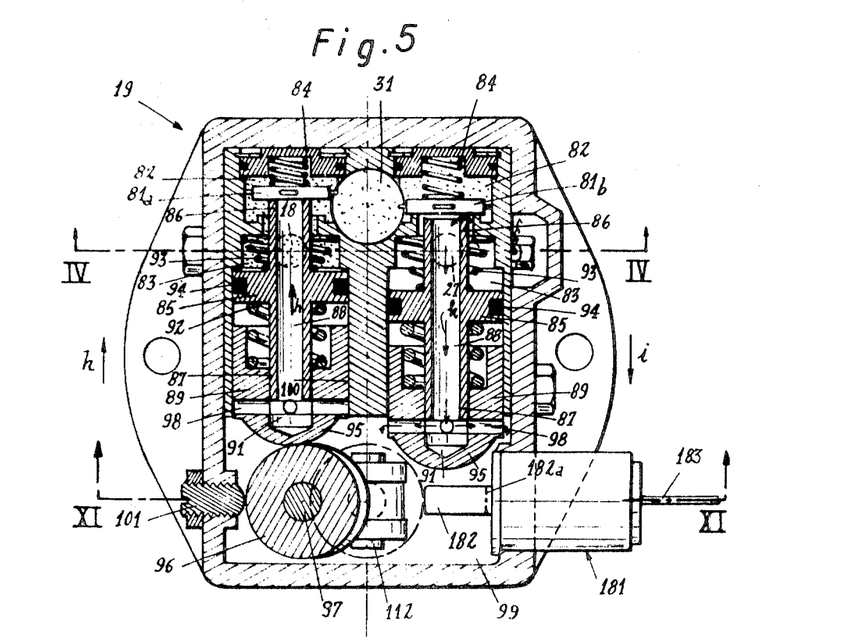
FIG. 5 is a corresponding transverse sectional view taken along line V-V of FIG. 4.
Figure 6:
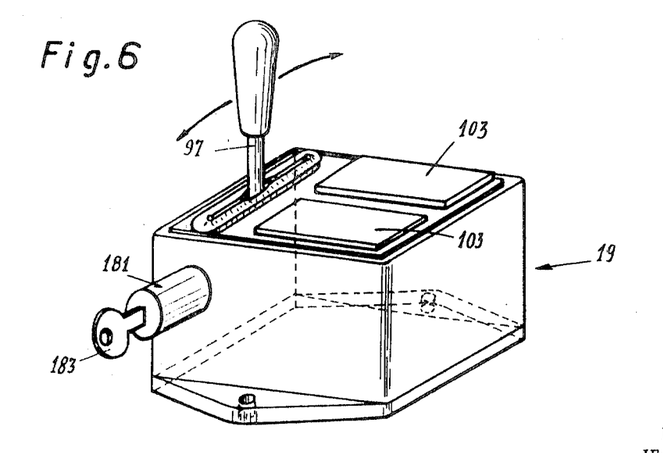
FIG. 6 is a perspective view of the control box.
Figure 11:
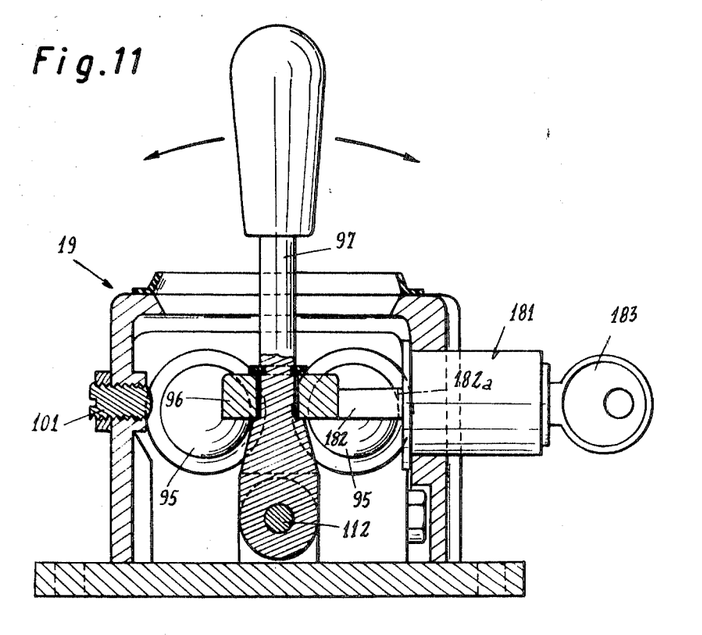
FIG. 11 is a transverse sectional view of the control box, this view being taken along line XI-XI of FIG. 5 and showing an antitheft device.

One form of construction of the control box 19 is illustrated in FIGS. 4 to 6 and in FIG. 11. The control box comprises essentially two valves which are similar in constructional design and control respectively the locking and release of the brakes. EAch valve comprises an air-admission gate 81a or 81b which form a separation between a chamber 82 into which opens the admission port 31 which is connected to the auxiliary reservoir 28 and another chamber 83 into which open respectively the locking control port 18 and the release control port 27. The box 19 is shown in FIGS. 4 and 5 in the locking position and the valve gate 81a is consequently open whilst the gate 81b is closed. The gates 81a and 81b are urged towards the closed position by means of restoring springs 84.

So far as the operation of the valve gates 81a, 81b is concerned, provision is made for a piston 85, one face of which forms a movable wall of the chamber 83. The piston 85 is adapted to carry on one side a valve-operating rod 86 and on the other side a guide rod 87. A passageway 88 is formed within the piston rods 86 and 87 and also passes through the piston 85. A pusher 89 which is fitted within a cylinder 100 is pierced by an axial blind-end bore 91 within which the extremity of the guide rod 87 is adapted to slide. A spring 92 is mounted between the piston 85 and the pusher 89 and a restoring spring 93 tends to move the piston 85 away from the valve gate 81a or 81b. An O-ring seal 94 carried by the piston 85 ensures leaktight closure of the chamber 83.

The pusher 89 is provided with a terminal abutment dome 95 against which is applied a runner-wheel 96 which is secured to an operating lever 97 (as shown in FIGS. 6 and 11). The lever 97 is pivoted about a pin 112 and is capable of taking up three different positions. In the locking and unlocking positions, the runner-wheel 96 is applied against the abutment dome 95 of one of the two pushers 89. In an intermediate neutral position, the runner-wheel 96 is placed between the two abutment domes 95 which are accordingly free.

The pusher 89 is also pierced by a passageway 98 which is located at right angles to the passageway 88 and communicates with this latter. When the push-rod 89 is actuated by the runner-wheel 96, the discharge ports of the passageway 98 are sealed-off by the wall of the cylinder 100 but open into a chamber 99 which is connected to the atmosphere when the pusher 89 is not in contact with the runner-wheel 96. An adjustable stop 101 serves to adjust the travel of the operating lever 97 and consequently the travel of the pusher 89 which controls the locking action.

The control box 19 is further provided with a luminous warning device which comprises an indicator lamp 102 protected by a transparent casing 103. The lamp 102 is connected by lead wires 104 to the storage battery of the vehicle (not shown). There is inserted in one of the lead wires 104 an automatic switch provided with a stationary contact-stud 105 which is mounted in an insulating element 106 and connected to a lead wire 104 and a movable contact-stud 107 which is integral with a piston 108. The piston 108 is slidably mounted within a passageway 109 pierced between the locking-control discharge port 18 and release-control discharge port 27, the movable stud 107 being placed opposite to the locking-control port 18. The movable stud 107 is adapted to carry a flexible contact 111 formed by a helical wire, the extremity of which projects slightly in the rest position with respect to the extremity of the stud 107.

The control box 19 is fitted with an antitheft device 181 of a type known per se which is secured to the casing of the box 19. The device 181 comprises a locking lug 182 operated by means of a key 183. In the antitheft position which is shown in FIGS. 5 and 11, the lug 182 bears on the runner-wheel 96 of the operating lever 97. The antitheft device 181 is mounted on the same side as the brake-release control device so that, when it is placed in the antitheft position, the lug 182 prevents the lever 97 from being moved into the brake-release position. On the contrary, when the device 181 is placed in the operating position, the lug 182 withdraws into the interior of the body of said device (namely in the position 182a shown in FIGS. 5 and 11) and frees the lever 97.

The operation of the control box 19 is as follows:

When the operating lever 97 is moved to the locking or release position, the runner-wheel 96 comes into contact with the abutment dome 95 of the corresponding pusher 89 and causes this latter to move forward in the direction h as shown in FIG. 5. The pusher 89 compresses the spring 92 which in turn displaces the piston 85 in the same direction h and causes the opening of the valve gate 81a.

The compressed air can then flow from the chamber 82 to the chamber 83 as indicated by means of the dotted portions of one of the halves of FIG. 5 and thence into the appropriate distribution circuit through the ports 18 or 27 as the case may be. Furthermore, the effect of the pressure on the face of the piston 85 within the chamber 83 is added to the restoring force to the springs 84 and 93 and tends to push back the piston 85 into the interior of the recess 91 of the pusher 89 and consequently to close the valve 81. A reverse feedback effect is thus obtained and serves on the one hand to limit the pressure within the distribution circuits and on the other hand to ensure progressive opening of the valve 81. The result last mentioned is of particular significance when it is desired to employ the control box 19 and the auxiliary reservoir 28 for emergency braking since progressive brake application is thus ensured.

Adjustment of the stop 101 serves to limit the travel of the runner-wheel 96 and consequently the travel of the pusher 89 which controls the locking of the brakes. As a result of the reverse-feedback action which has just been explained, there is thus obtained a locking control pressure which is lower than the release control pressure. In a typical case, the release control pressure is of the order of 7 bars whereas the locking control pressure is only 5 bars.

By virtue of the cylindrical shape of the runner-wheel 96 and the spherical shape of the abutment domes 95, the lever 97 is automatically restored to the neutral position under the action of the springs 84, 92 and 93 as soon as it is released by the operator.

The pusher 89 and the piston 85 accordingly return rearwards in the direction i and the extremity of the piston rod 86 is maintained at a distance from the valve 81, thereby establishing a communication between the chamber 83 and the passageway 88. The ports of the passageway 88 are also put into communication with the chamber 99 and this latter is in turn connected to the atmosphere. The air which was previously delivered into the locking cylinder 47 can thus pass out through the corresponding distribution circuit and the port 18 or 27 along the flow path k.

When the lever 97 is in the locking position, the air pressure which is maintained at the port 18 (shown in FIG. 4) forces back the piston 108 of the warning device. The movable contact-stud 107 is applied against the stationary stud 105, with the result that the lamp 102 lights up.

When the lever 97 is brought back to the neutral position, the pressure at the port 18 is reduced to zero as has been explained earlier but the piston 108 which is no longer acted upon by any restoring force remains in position and the lamp 102 remains lighted. If as a result of shocks or vibrations, the piston 108 is slightly displaced, the flexible wire 111 maintains the contact.

When the lever 97 is moved to the unlocking position, an air pressure is established at the port 27, with the result that the piston 108 moves back and causes the contact to open. The indicator lamp 102 thus remains lighted up as long as the brakes are locked.

Figure 8:
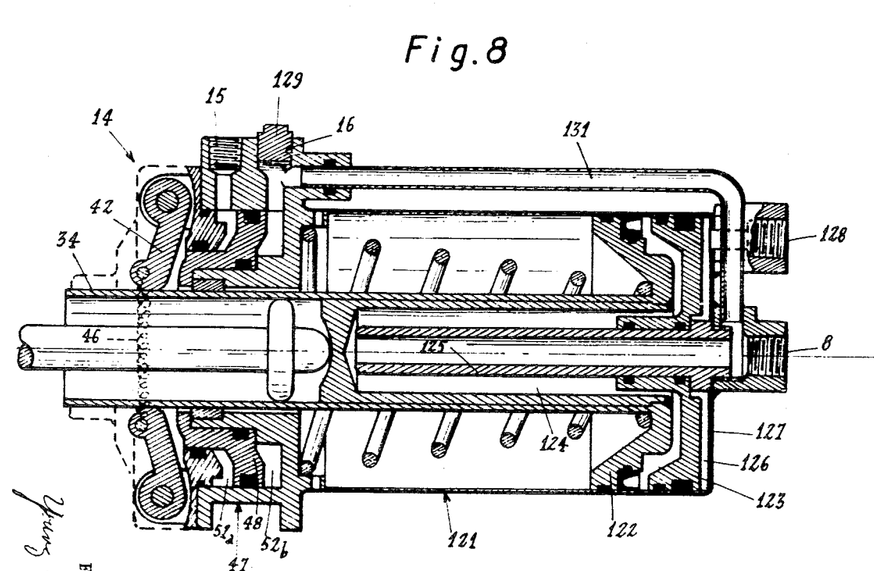
FIG. 8 is an axial sectional view taken along line VIII-VIII of FIG. 9 showing the double-piston brake cylinder which is employed in the system shown in FIG. 7.

The invention also applies to the case in which the brake cylinder comprises a double piston or a telescopic piston. The case of a double-piston cylinder is illustrated in FIG. 8. The brake cylinder 121 comprises in a manner known per se a main piston 122 which is directly coupled to the brake-actuating rod 34 and an auxiliary piston 123 which is disposed upstream of the piston 122 with respect to the brake-actuating rod 34. The pistons 122 and 123 define within the cylinder 121 an intermediate chamber 124 which is connected to the admission port 8 for normal brake-application control via a duct 125 which passes in leaktight manner through the auxiliary piston 123. The chamber 126 which is defined by the auxiliary piston 123 and the front cylinder-head 127 of the cylinder 121 is connected to an air admission port 128.

The cylinder 121 is additionally provided with the same locking units 14 as the units which were described earlier. In this case, the invention makes provision for closing the admission port 16 by means of a plug 129 and for connecting the chamber 52b to the admission port 8 of the brake cylinder via a duct 131.

Figure 7:
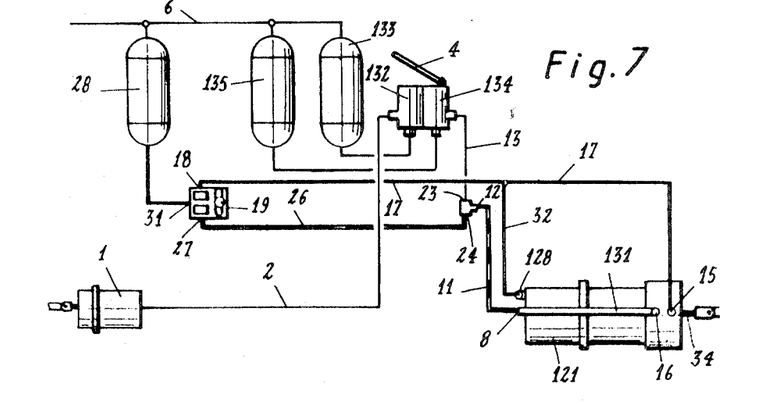
FIG. 7 is a pneumatic layout diagram of a brake application and locking system comprising a brake cylinder of the double piston and telescopic type.

FIG. 7 represents the pneumatic layout which is employed with the double-piston cylinder 121. In this figure, the same components as in FIG. 1 are provided with the same reference numerals. The control valve which is actuated by the brake pedal 4 has a double body. A body 132 which is supplied from another reservoir 135 controls the double-piston cylinder 121 for brake application at the rear wheels.

As in the previous embodiments, the normal or service-braking circuit comprises the air lines 11 and 13 and the two-way valve 12. The air line 11 terminates at the port 8 of the cylinder 121 which controls the movement of the main piston 122.

The release-control air distribution circuit comprises as in the previous embodiments the pipes 11 and 26 and the two-way valve 12 but the pipe 21 of FIG. 1 is replaced by the pipe 131 which is carried by the body of the cylinder 121.

The release-control distribution circuit also comprises the pipe 17 which terminates in the port 15 of the locking cylinder and the bypass 32. However, said bypass terminates in the port 128 which controls the motion of the auxiliary piston 123.

The operation of the device is the same as in the previous embodiment.

In this case, the two-way valve 9 and the pipe 21 which, in the embodiment of FIG. 1, was intended to be fitted with flexible and therefore delicate connections is accordingly dispensed with and replaced by the pipe 131 which is stationarily mounted on the body of the cylinder 121.

Figure 10:
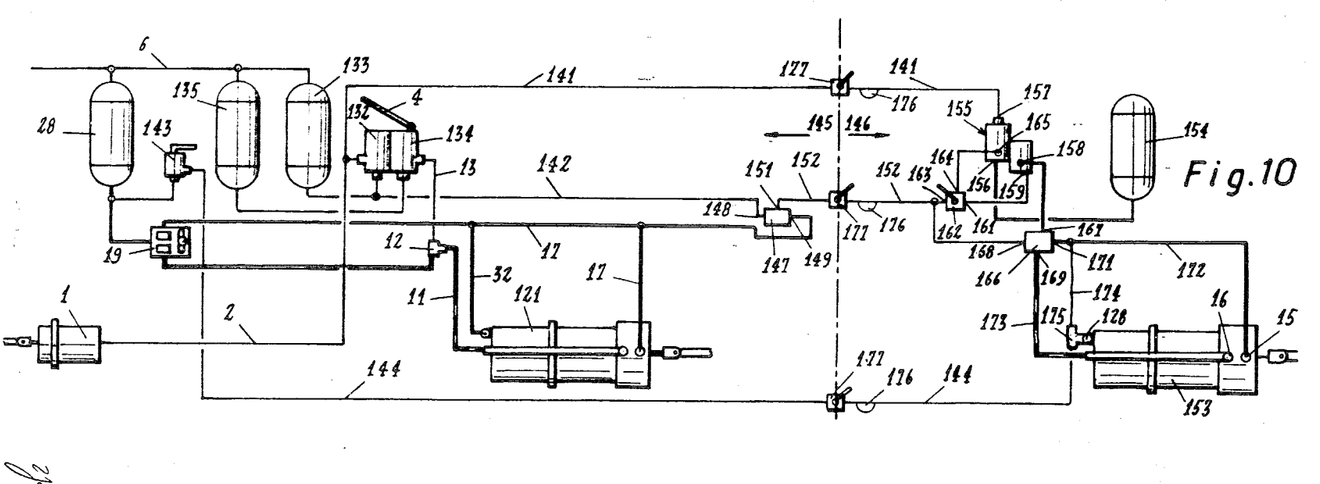
FIG. 10 is a pneumatic layout diagram of a brake application and locking system as applied to a tractor and a trailer.

The description which now follows with reference to FIG. 10 relates to an embodiment which is contemplated by the invention in the case of a vehicle which is intended to draw a trailer or semitrailer. The same reference numerals have again been assigned to the same components as those shown in FIGS. 1 and 7.

The equipment 145 of the tractor consists of the same elements as in FIG. 7 to which are added the trailer connection circuits, these latter being known per se. A circuit 141 for service brake application at the trailer wheels connected to the outlet of the body 132 of the main control valve. An automatic circuit 142 is directly connected to the main reservoir 133. For the purpose of emergency braking of the trailer, provision is made for a manual-control auxiliary valve 143 which is supplied from the emergency reservoir 28 and the discharge port of which is connected to an emergency circuit 144.

In order to control interlocking and release of the trailer, provision is made in accordance with the invention to interpose in the automatic circuit 142 an exhaust valve 147 having an inlet 148, an outlet 151 and a control inlet 149. The inlet 148 of the valve 147 is connected to the automatic circuit 142 and the control inlet 149 of said valve 147 is connected to the distribution circuit 17 which controls the interlocking operation. The outlet 151 of the valve 147 is connected to an automatic circuit 152 which is in turn connected to the trailer. The exhaust valve 147 is so arranged that, when a pressure of air is applied to the control inlet 149 via the circuit 17, the outlet 151 and the circuit 152 are opened to the atmosphere. On the contrary, when there is no pressure at the control inlet 149, the valve 147 puts the circuits 142 and 152 into communication with each other.

In the embodiment which is illustrated, the trailer comprises a double-piston brake cylinder 153 which is similar to the cylinder 121 already described. However, the invention also applies to a single-piston brake cylinder of the type shown in FIG. 1.

The equipment 146 of the trailer comprises an emergency relay valve 155 of a type known per se and normally designed to ensure automatic braking of the trailer in the event of a failure of the hitch system.

The emergency relay valve 155 comprises a control inlet 157, a service supply inlet 159 and a supply inlet 156. The control inlet 157 is connected to the service application control circuit 141. The service supply inlet 159 is connected to the outlet 161 of a manual-control two-way parking valve 162. Finally, the supply inlet 156 is connected to an auxiliary reservoir 154 which is mounted on the trailer.

An inlet 163 of the parking valve 162 is connected to the automatic circuit 152 and a second inlet 164 of said valve 162 is connected to an outlet 165 of the emergency relay valve 155.

The invention provides for the addition of a reversing valve 166 which has an inlet 167, two outlets 169 and 171 and a control inlet 168. The reversing valve 166 is so designed that, if a pressure is applied to its control inlet 168, the inlet 167 is put into communication with the outlet 169.

On the contrary, if the pressure at the control inlet 168 is zero, the inlet 167 is put into communication with the outlet 171. The inlet 167 of the valve 166 is connected to one outlet 158 of the emergency valve 155. The outlets 169 and 171 of the reversing valve 166 are connected respectively to the distribution circuit 173 for producing release action and the circuit 172 for producing locking action. The control inlet 168 of the reversing valve 166 is connected to the automatic circuit 152.

The control port 128 of the auxiliary brake piston is connected to a two-way valve 175 which puts said port into communication on the one hand with the emergency circuit 144 and on the other hand with a bypass 174 of the locking control circuit 172.

The circuits 141, 152, 144 of the trailer are connected to the tractor circuits which have the same reference numerals by way of quick-coupling valves 176 and two-way valves 177 which are known per se.

For the sake of clarity of the description, the operation of the emergency relay valve 155 will now be explained briefly.

During normal running and in the rest position, the service supply inlet 159 is under pressure and the control inlet is at zero pressure. The inlet 159 is then put into communication with the inlet 156, thereby maintaining the pressure within the reservoir 154.

For service brake application, the brake pedal 4 is actuated and the control inlet 157 is put under pressure. The result thereby achieved is to establish a communication between the supply inlet 156 and the outlet 158 which, in a conventional trailer brake installation, causes application of the brakes at the trailer wheels.

In the event of failure of the hitch system, both inlets 157 and 159 are at zero pressure. The inlet 156 is then connected to the outlet 158, thereby initiating brake application.

The operation of the device in accordance with the invention is as follows:

When the trailer is hitched to the tractor, the parking valve 162 is placed in the service position in which the inlet 163 is in communication with the outlet 161. The automatic circuit 152 is thus directly connected to the service supply inlet 159 of the emergency relay valve 155.

During normal operation, the control box 19 is in the neutral position and consequently the pressure at the control inlet 149 of the exhaust valve 147 is zero. The two automatic circuits 142 and 152 are accordingly connected to each other. The pressure within the main reservoir 133 is transmitted to the service supply inlet 159 of the emergency valve 155 and to the control inlet 168 of the reversing valve 166. The inlet 167 of the reversing valve 166 is then connected to the outlet 169.

When the brake pedal 4 of the tractor is depressed, the pressure of the reservoir 133 is transmitted via the circuit 141 to the control inlet 157 of the emergency valve 155. As has been stated in the foregoing, this has the effect of putting the inlet 156 of said valve into communication with the outlet 158 of this latter. The pressure is then transmitted through the reversing valve 166 to the circuit 173 which actuates the main piston of the brake cylinder 153.

In the event of failure of the hitch system, it has been seen from the foregoing that the emergency valve 155 transmits the pressure of the trailer reservoir 154 to the outlet 158. Furthermore, the inlet 167 is connected to the outlet 171 in the reversing valve 166. The pressure of the trailer reservoir 154 is thus transmitted to the circuit 172 and to the bypass 174, thereby causing brake application and locking of the trailer brakes.

At the time of parking and when it is desired to lock the brakes, the lever of the control box 19 is moved to the locking position, thereby putting the circuit 17 under pressure and causing locking of the tractor brakes as stated in the foregoing. In addition, the pressure of the circuit 17 is transmitted to the control inlet 149 of the exhaust valve 147 and this has the effect of reducing the pressure to zero within the automatic circuit 152. The emergency valve 155 and the reversing valve 166 operate as in the case of failure of the hitch system and cause application and locking of the trailer brakes.

Unlocking of the tractor brakes is carried out as described earlier. In order to release the trailer brakes, the brake pedal 4 must be actuated in order to produce the effect, as described above in the case of the brake action, of initiating the simultaneous operation of the auxiliary application piston of the cylinder 153 and of the piston 48 of the locking units 14 via the port 15.

When an unhitched trailer is parked, the emergency relay valve 155 operates as stated earlier in the case of a hitch failure and produces brake application and locking. In order to prevent the air under pressure from remaining trapped within the brake cylinder 153, the valve 162 is placed in the parking position. In this position, the inlet 164 is connected to the outlet 161 and the pressure of the reservoir 154 is applied to the inlet 159 of the emergency relay valve 155. Said emergency valve is thus placed under the same conditions as when the brake pedal 4 is released after the brakes have been applied. The outlet 158 of the emergency valve 155 is opened to the atmosphere, thereby permitting the air contained within the cylinder 153 to escape. The abutting application of the locking arms 42 against the brake-actuating rod 34 then takes place as stated above.

In the event of failure of the main circuits, the auxiliary reservoir 28 of the tractor can be employed and this makes it possible to actuate the tractor brakes by means of the box 19 and the trailer brakes by means of the valve 143 and the emergency circuit 144.

Figure 12:
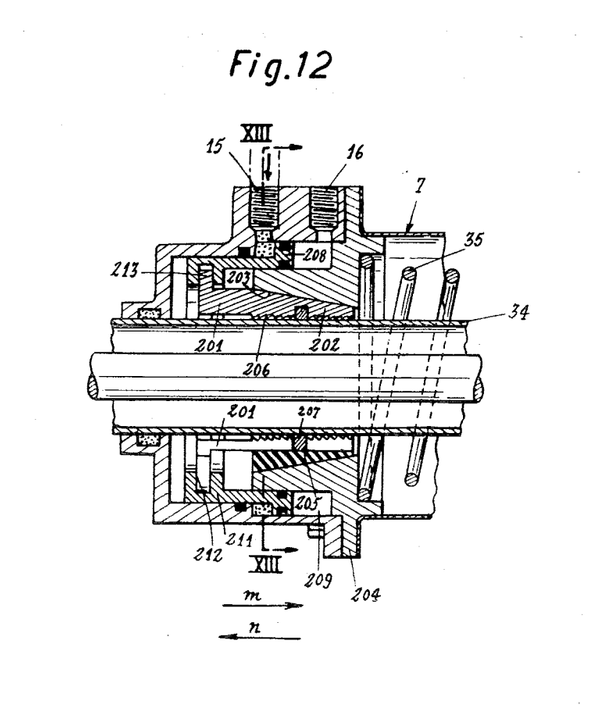
FIG. 12 is an axial sectional view taken along line XII-XII of FIG. 13 and showing another form of construction of the components employed for locking the brake-actuating rod.
Figure 13:
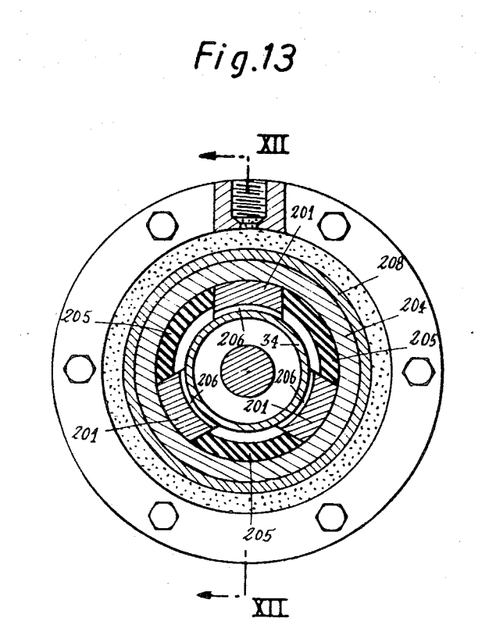
FIG. 13 is the corresponding diametral sectional view taken along line XIII-XIII of FIG. 12.

Referring to FIGS. 12 and 13, there will now be described another form of construction of the locking units of the brake cylinder. As in the embodiment which was described previously, this second embodiment can apply equally well to a single-piston cylinder and to a cylinder of the type comprising a double or telescopic piston.

The components for locking the brake-actuating rod 34 are constituted by three wedges 201 disposed at angular intervals of 120° over a cylindrical surface which is coaxial with the brake-actuating rod 34. Said wedges 201 each have a frustoconical extremity 202 which is capable of moving within a recess 203, also of frustoconical shape, which is formed within the back-head 204 of the brake cylinder 7. Segments 205 of plastic material which are placed between the wedges 201 complete the cylindrical surface and maintain the three wedges 201 continuously expanded. The internal face 206 of each wedge 201 is adapted to slide over the peripheral surface of the brake-actuating rod 34 and is guided by means of a felt ring 207. In order to ensure better adhesion in the locking position, said internal face 206 is provided with indentations.

As in the preceding embodiment, the components for actuating the locking wedges 201 comprise a piston 208 which is slidably fitted within a locking cylinder 209 having a toric volume. The piston 208 divides the cylinder 209 into two chambers which are connected respectively to the locking-control port 15 and to the release-control port 16. The piston 208 is provided with a skirt 211 in which is formed an annular groove 212. The locking wedges 201 are each provided with an annular flange 213 which is adapted to engage within the groove 212 so that the piston 208 and the wedges 201 are coupled for translational motion.

In order to lock the brakes, air under pressure is conveyed by means of the control box 19 simultaneously into the brake cylinder 7 and into the locking-control port 15 as shown in FIGS. 12 and 13. The brake-actuating rod 34 moves in the direction $n$, thereby initiating application of the brakes and, on the other hand, the piston 208 and the three locking wedges 201 are displaced in the direction $m$. By reason of the frustoconical shape of the recess 203, this displacement causes clamping of the wedges 201 about the brake rod 34. When the control box 19 is brought back to the neutral position, the compressed air is discharged from the brake cylinder 7 and from the locking cylinder 209. The restoring spring 35 then tends to return the brake rod 34 in the direction $m$, thereby abuttingly applying the rod 34 against the indented face 206 of the wedges 201 and thus locking the brakes.

In order to release the brakes, compressed air is delivered simultaneously into the brake cylinder 7 and through the release-control port 16. The pressure within the cylinder 7 eliminates abutting contact of the wedges 201 with the brake-actuating rod 34. The piston 208 displaces the locking wedges 201 in the direction $n$ and frees them from the recess 203. Under the elastic action of the segments 205, the wedges 201 move away from the brake rod 34 which is thus released.

An improved form of construction of the brake cylinder will now be described with reference to FIGS. 14 to 18.

Figures 14, 16, 17:
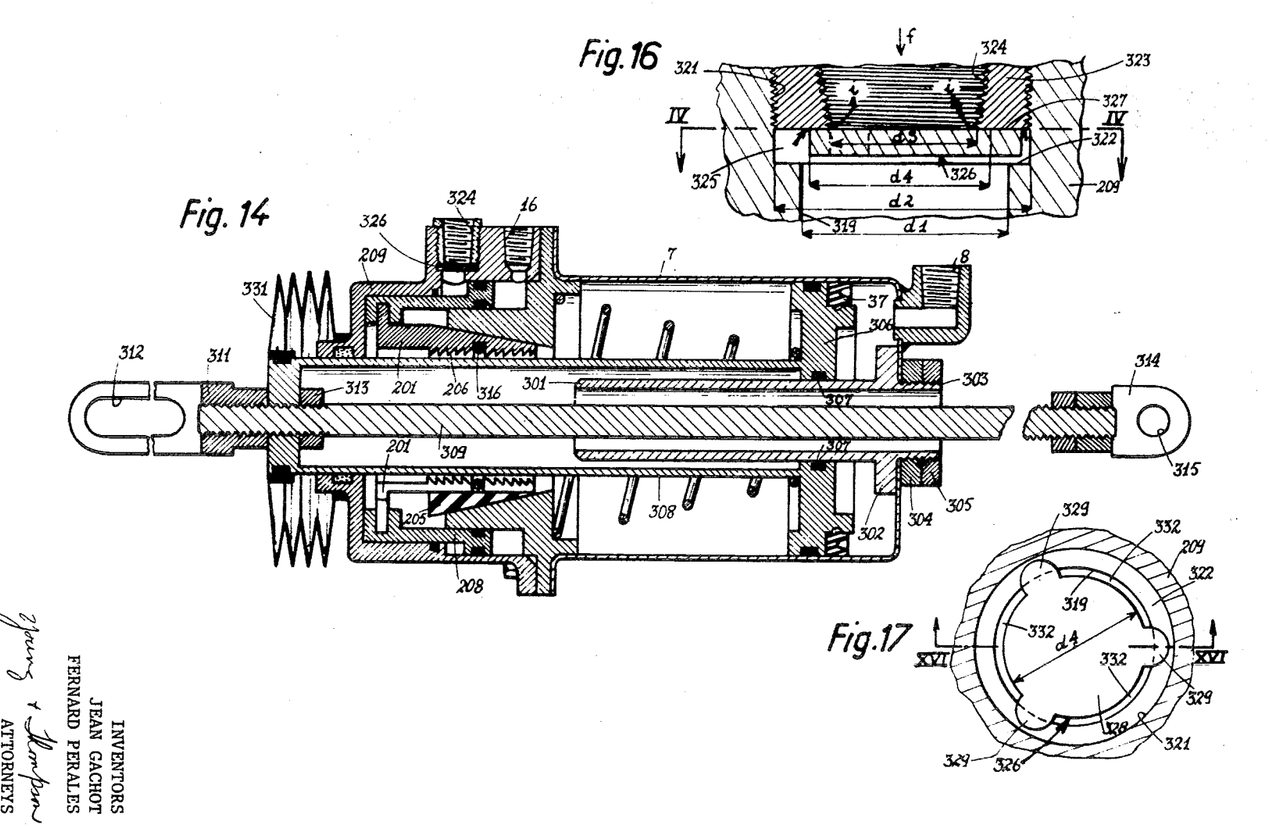
FIG. 14 is an axial sectional view of a brake cylinder with locking components and comprising members which permit of adaptation to the emergency brake of a vehicle of medium weight, the cylinder being in the released position.
FIG. 16 is an enlarged fragmentary sectional view of a detail of FIG. 14 showing the locking-unit time-delay system, this view being taken along line XVI-XVI of FIG. 17.
FIG. 17 is a sectional view taken along line XVII-XVII of FIG. 16.

The cylinder comprises a casing 7 which has an air admission port 8. A cylindrical sleeve 301 which is coaxial with the casing 7 is provided with an annular flange 302 which is applied against the cylinder head. The terminal portion 303 of the sleeve 301 which projects from the casing 7 is threaded so as to accommodate a nut 304 and a locknut 305 for securing the sleeve.

An annular brake-application piston 306 is capable of moving within the interior of the casing 7 and slidably mounted on the sleeve 301. Said piston is fitted with a packing ring 37 and a seal 307 for ensuring leaktightness with respect to the sleeve 301. The piston 306 carries a hollow actuating rod 308 which is coaxial with the sleeve 301 and surrounds this latter. A cylindrical rod 309 which is placed in the centerline of the cylinder projects at each end of this latter. One of the threaded extremities of said rod is provided with an end-fitting 311 in which is formed an elongated slot 312 and is attached to the piston rod 308 by means of a nut 313. The other extremity of the rod 309 which is also threaded is provided with an end-fitting 314 which carries a stud 315.

Figures 15, 18:
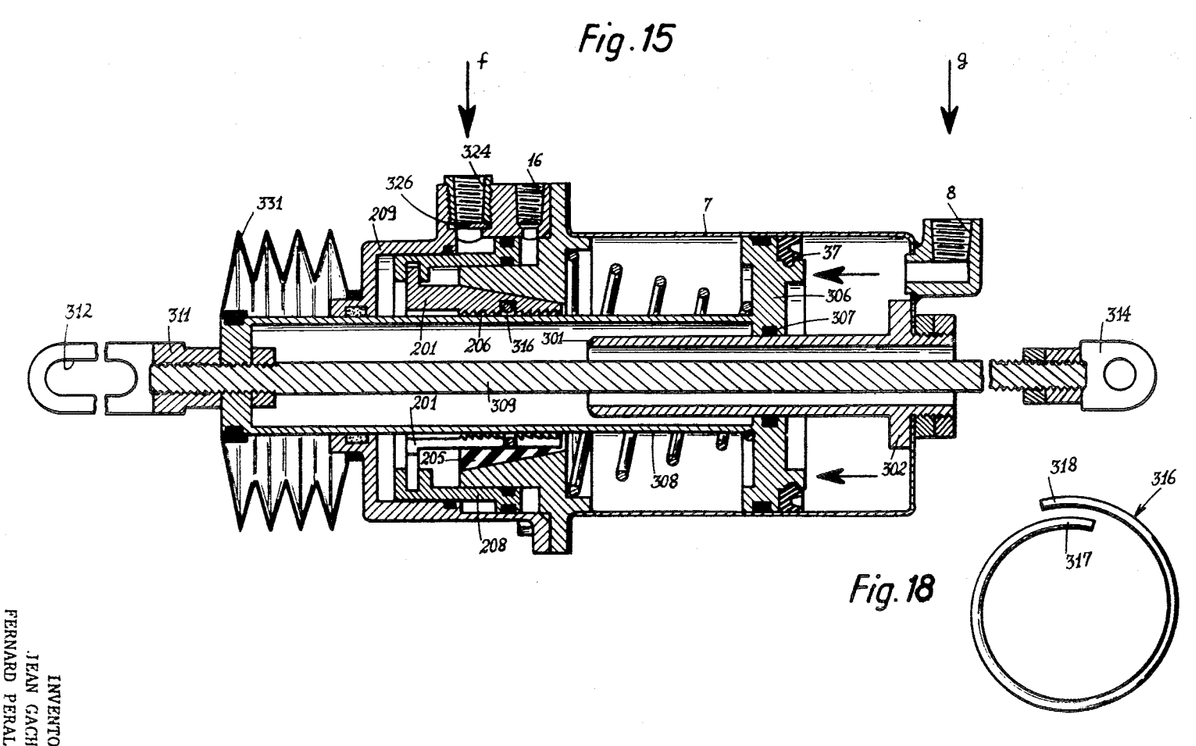
FIG. 15 is the corresponding view in the locking position.
FIG. 18 is a plan view of the spring for restoring the locking units of FIG. 14.

In accordance with the embodiment of FIGS. 12 and 23, the locking unit comprise three frustoconical locking wedges 201 each having an annular groove. There is mounted in said groove a circular spring 316, the ends 317 and 318 of said spring being adapted to overlap over a certain distance (as shown in FIG. 18).

The locking-control port 324 is fitted with a time-delay system which permits instantaneous admission of the control compressed-air and causes a time-lag in the discharge of said air.

To this end (as shown in FIGS. 16 and 17), the wall of the locking cylinder 209 is provided with an inner orifice 319 having a diameter $d_1$ and an outer orifice 321 having a diameter $d_2$ which is greater than $d_1$. The two orifices 319 and 321 are joined by means of an annular shoulder 322. A bushing 323 is screwed into the outer orifice 321 and provided with a threaded conical bore having a diameter $d_3$ at the base which is smaller than the diameter $d_1$ of the inner orifice 319. The base of the bushing 323 has a rough surface 327 located at a predetermined distance from the annular shoulder 322 so as to form a space 325 in which a movable shutter 326 is housed.

Said shutter 326 has a circular central portion 328 having a diameter $d_4$ comprised between the diameter $d_3$ of the bore 324 and the diameter $d_1$ of the inner orifice 319. Three lobes 329 are disposed at angular intervals of 120° at the periphery of the central portion 328, the diameter of the circle which is circumscribed about said lobes being larger than the diameter $d_1$ of the inner orifice 319 and slightly smaller than the diameter $d_2$ of the outer orifice 321. The thickness of the shutter 326 as measured along the axis of the orifices 319 and 321 is smaller than that of the space 325.

The cylinder further comprises a bellows element 331 which is welded at one end to the extremity of the piston rod 308 and at the other end to the outer wall of the locking cylinder 209. Said bellows element is intended to prevent soiling agents such as dust particles or projections of oil or water from fouling the piston rod and from penetrating into the locking cylinder.

The design function of the rod 309 will be described hereinafter with reference to FIG. 20.

Brake application and release are carried out in the manner which has been described earlier.

In order to release the brakes, air under pressure is delivered simultaneously to the locking control port 324 (as indicated by the arrow $f$ in FIGS. 15 and 16) and to the port 8 which provides admission to the brake cylinder (arrow $g$ in FIG. 15) by means of the control box described above. The air which arrives through the port 324 applies the lobes 329 of the movable shutter 326 against the shoulder 322 (as shown in FIG. 17). As a result of the respective diameters $d_1$ and $d_4$ of the internal orifice 319 and of the central portion 328 of the shutter, annular spaces 332 remain free so as to permit of instantaneous flow of air into the inner orifice 319 and into the interior of the locking cylinder.

When the control box is moved to the neutral position, the pressure at the port 324 is reduced to zero and the air contained within the locking cylinder applies the shutter 326 against the base of the bushing 323 as shown in FIG. 16. Since the base of the bushing is provided with a certain degree of surface roughness, the shutter does not close the port 324 in a wholly leaktight manner and the air is permitted to escape at a relatively low rate along the path indicated by the arrows $i$. A time-lag is thus introduced in the discharge of the control air which is of the order of a few seconds and gives the locking piston 208 and the wedges 201 time to carry out the locking of the piston rod 308 in spite of their inertia.

It has been proved by experience that, as each locking operation takes place, the overlapping of the ends of the circular spring 316 causes a rotation of all the locking wedges 201 about the axis of the piston rod 308. At each operation, the wedges therefore bear on a different portion of said rod, thereby reducing the wear of the rod and preventing this latter from being marked by the teeth of the wedges.

Figure 19:
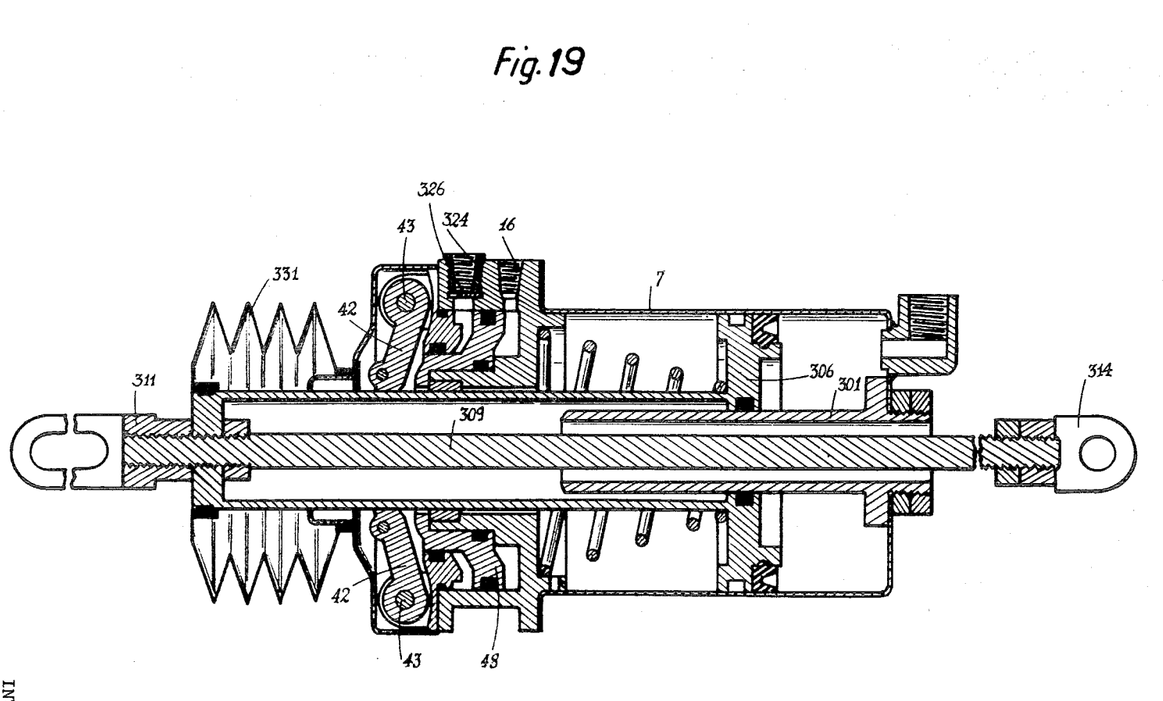
FIG. 19 is an axial sectional view of a second embodiment of a brake cylinder which is similar to FIG. 14.

The time-delay system which has just been described can be applied as shown in FIG. 19 to the locking system described with reference to FIGS. 2 and 3 in which the locking units of the piston rod are constituted by arms 42 which are pivoted about a pin 43 and actuated by a locking piston 48.

The cylinder which is illustrated in FIG. 19 also comprises the central rod 309, the bushing 301 and the annular application piston 306 which have been described in the foregoing.

Figure 20:
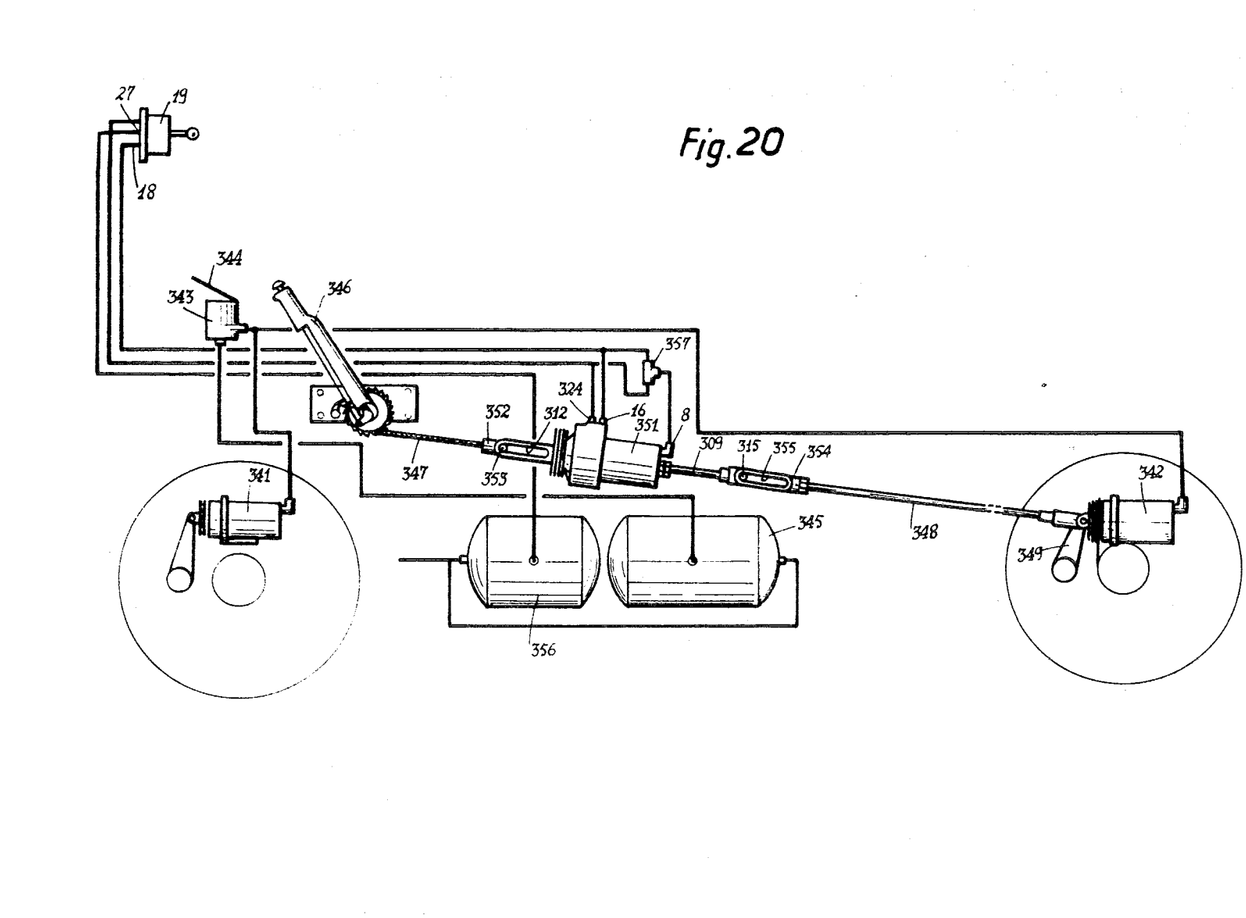
FIG. 20 is a diagram of an improved brake system for motor vehicles of medium weight.

Referring to FIG. 20, there will now be described an improved brake system which is applicable to motor vehicles of medium rated weight and makes use of the cylinder hereinabove described.

Vehicles having a rated weight of less than 16 tons are usually provided with a main compressed-air brake system and a manually operated emergency brake system.

The main brake system comprises a cylinder 341 for brake application at the front wheels and a cylinder 342 for application at the rear wheels. The cylinders 341 and 342 are not provided with locking units and are controlled by a brake valve 343 which is actuated by a foot pedal 344. The compressed air which is necessary for applying the brakes is supplied from a reservoir 345 fed by a compressor which is not illustrated in the drawings.

The emergency brake system comprises a hand brake lever 346, one end of which is connected to a cable 347. In the standard equipment of vehicles, said cable is attached to a link-rod 348 which actuates the rear-brake control arm 349.

Provision is made in accordance with the invention for interposing between the cable 347 and the link-rod 348 an operating cylinder 351 which has the same structure as the brake cylinder described earlier with reference to FIGS. 14 and 15 or with reference to FIG. 19.

The cable 347 is provided with an end-fitting 352 comprising a nipple 353 which is similar to the end-fitting 314 of the rod 309 which is mounted within the cylinder 351. In addition, the link-rod 348 is equipped with a turnbuckle 354 provided with an elongated slot 355. The nipple 353 of the cable 347 is engaged within the elongated slot 312 of the rod 309 and the nipple 315 of this latter is engaged within the elongated slot 355 of the link-rod 348. In this manner, the direct mechanical connection between the lever 346 and the brake control arm 349 is maintained; in addition, said control arm 349 can be actuated by the piston 306 of the cylinder 351.

The operating cylinder 351 comprises locking units of the type described in the foregoing, said units being controlled by a locking control box 19. The box 19 is connected to an auxiliary reservoir 356 and the two control outlets 18 and 27 of the box are connected respectively to the locking control port 324 and release port 16 of the cylinder 351. The two outlets 18 and 27 are also connected by means of a double check valve 357 to the application control inlet 8 of the cylinder 351.

The system which has just been described makes it possible:
to brake normally by making use of the valve 343 which actuates the brake cylinders 341 and 342. By virtue of the elongated slot 355, the link-rod 348 is capable of displacement without being accompanied by the rod 309 of the operating cylinder.
to use the handbrake, in particular for the purpose of immobilizing the vehicle when this latter is stopped. The link arm 349 serves to control the rear brakes is actuated in this case by the lever 346 through the cable 347, the rod 309 and the link-rod 348.
to use a compressed-air emergency brake system. It has in fact been explained earlier that, by bringing the control box 19 to the release position, a progressive air pressure is applied to the inlet 8 of the operating cylinder. The piston 306 of said cylinder displaces the rod 309 which actuates the rear-brake control link-arm 349. By virtue of the elongated slot 312, the cable 347 and the lever 346 are not displaced.

to lock the rear brakes at the time of parking of the vehicle. This is obtained by placing the box 19 in the locking position. As has been described earlier, this operation causes application of the rear brakes as a result of displacement of the piston of the operating cylinder 351 and locking of the piston rod 308. The brakes are released by placing the box 19 in the release position.

As will be readily understood, the invention is not limited to the embodiments which have just been described and a large number of alternative forms of construction may accordingly be contemplated without thereby departing from the scope of this invention. Thus, in the time-delay system which is applied to the locking control, it is possible to employ a movable shutter 326 having a circular profile, in which case the diameter of the inner orifice 319 is smaller than the diameter of the shutter and is provided with peripheral grooves which are not closed by the shutter in order to permit of instantaneous admission of air into the locking cylinder. The different pistons of the pneumatic control units can be replaced by diaphragms. Similarly, the devices for locking the brake-actuating rod 34 can be replaced by any other locking device of known type.

We claim:

1. A locking system for compressed air brakes of road vehicles, comprising locking members for locking the brake-operating rod of a brake cylinder, a locking member actuating piston mounted within a cylinder and defining two chambers therein, two compressed air distribution circuits connected to said chambers respectively, means for delivering compressed air selectively into either of said circuits to cause the locking or release of said brake-operating rod, said locking members comprising frustoconical wedges mounted at the periphery of and disposed about and coaxially to said brake-operating rod and connected to said locking member actuating piston and movable into or out of engagement with a fixed conical mating surface.

2. A system as claimed in claim 1, wherein said piston is recessed so as to accommodate said frustoconical wedges, said piston and said wedges being coupled for translation motion.

3. A system as claimed in claim 1 each of said chambers having a compressed air inlet connected to one of said distribution circuits respectively for controlling the locking or release of said brake-operating rod, the locking control inlet having a time-delay system so arranged as to permit instantaneous air admission and to introduce a time-delay in the air discharge.

4. A system as claimed in claim 3, wherein the time-delay system comprises a movable shutter actuated by the pressure of the control air and applied in the direction of discharge against a seating which has a rough surface in order to introduce a resistance to the discharge of air.

5. A system as claimed in claim 4, wherein the movable shutter is so designed as to seal off only to a partial extent the orifice for the admission of control air to the locking members so that the air is admitted without any time-lag.

6. A system as claimed in claim 1, comprising a one-turn spiral spring mounted in an annular groove formed in said wedges, said spring having overlapping end portions.

7. A system as claimed in claim 1, wherein the internal face of each wedge which is applied against the brake-actuating rod is indented so as to ensure better adhesion to said rod in the locking position.

8. A system as claimed in claim 1, comprising a compressed-air auxiliary reservoir connected to a manual control box for the selective supply of the distribution circuits aforesaid, wherein the control box comprises two similar valves for selectively initiating the locking and release of the brakes, each valve being provided with a gate for the admission of air to one of the distribution circuits, a discharge passageway connected to said circuit and a pusher actuated by an operating lever, said pusher being intended to cause the gate to open in the operating position thereof and to open the discharge passageway to the atmosphere in the rest position thereof.

9. A system as claimed in claim 8, wherein each valve of the control box comprises a piston disposed between the pusher and the gate in order to actuate said gate, one face of said piston being connected to the pusher by elastic means and additional means being provided to ensure that the other face of said piston is subjected to the pressure developed within the corresponding distribution circuit in order to ensure progressive opening of the air admission gate.

10. A system as claimed in claim 9, wherein the control box comprises an adjustable stop for limiting the travel of the locking control pusher in order to obtain a locking control pressure which is lower than the release control pressure.

11. A system as claimed in claim 8, wherein the control box comprises a warning lamp system and means for actuating said warning system by means of the air pressure which is delivered to the locking units when the operating box is in the locking position.

12. A system as claimed in claim 8, wherein the control box comprises an antitheft device for locking the operating lever in the brake-locking position.